United States Patent
Klukis et al.

(10) Patent No.: US 11,905,120 B1
(45) Date of Patent: Feb. 20, 2024

(54) VIBRATORY CONVEYOR DRIVE SYSTEM

(71) Applicants: Edward Klukis, Amity, OR (US); Larry Beaudry, Amity, OR (US)

(72) Inventors: Edward Klukis, Amity, OR (US); Larry Beaudry, Amity, OR (US)

(*) Notice: Subject to any disclaimer, the term of this patent is extended or adjusted under 35 U.S.C. 154(b) by 0 days.

(21) Appl. No.: 18/478,919

(22) Filed: Sep. 29, 2023

Related U.S. Application Data

(60) Provisional application No. 63/413,164, filed on Oct. 4, 2022.

(51) Int. Cl.
*B65G 27/18* (2006.01)

(52) U.S. Cl.
CPC .................. *B65G 27/18* (2013.01)

(58) Field of Classification Search
None
See application file for complete search history.

(56) References Cited

U.S. PATENT DOCUMENTS

| | | | | |
|---|---|---|---|---|
| 5,979,640 A * | 11/1999 | Horton | ........... | B65G 27/32 198/752.1 |
| 6,112,883 A * | 9/2000 | Kraus | ........... | B65G 27/08 198/771 |
| 6,237,749 B1 * | 5/2001 | Musschoot | ........... | F16H 7/02 74/61 |
| 6,868,960 B2 * | 3/2005 | Jones | ........... | B65G 27/20 198/767 |
| 7,387,198 B2 * | 6/2008 | Thomson | ........... | B65G 27/20 198/760 |

\* cited by examiner

*Primary Examiner* — Kavel Singh
(74) *Attorney, Agent, or Firm* — Mark S Hubert PC

(57) ABSTRACT

A vibratory conveyor drive system that can be fitted onto most existing vibratory conveyors. It replaces the conventional vibrational drive and its connections to the trough or trough frame and dramatically increases the longevity of the vibratory conveyor. It is a simple inexpensive retrofit. It has a drive arm with a vibratory drive that is hung from one of its ends and is partially vertically supported underneath by a vertical spring means. The other end of the drive arm is connected to the trough or the trough frame. Between the vibratory drive the drive arm and the trough or frame, there is at least one flexion means to negate the vertical forces of the drive and utilize only the lineal drive forces. The drive arm is at an acute angle with respect to the linear axis of the trough so as to impart an oscillating translational movement to the trough.

10 Claims, 2 Drawing Sheets

VIBRATORY CONVEYOR DRIVE SYSTEM

CROSS-REFERENCE TO RELATED APPLICATIONS

THIS APPLICATION CLAIMS THE BENEFIT OF U.S. PROVISIONAL PATENT APPLICATION No. 63/413,164, FILED Oct. 4, 2022, WHICH IS INCORPORATED BY REFERENCE HEREIN IN ITS ENTIRETY.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to materials movement, and more particularly, to mechanical conveyor technology.

BACKGROUND

Material conveyors specifically of the vibratory trough type, are commonly used to move and convey materials from one point to another. They have relatively few mechanical parts and are very safe for nearby workers. They are desirable because of their inherent safety, ease of sanitation (as the trough is commonly made of stainless steel), and because the materials are not stationary (as on a moving conveyor belt, but rather are moved around as they travel). This makes this vibratory conveyor system ideal for inspection, grading, washing and sorting as the material passes.

Prior art vibratory conveyor systems suffer from many problems. Simply stated, they shake themselves apart. They have little in the way of longevity. The motors and associated unbalanced rotating weights (or eccentrics rotating about a fixed axis) generally require a heavy structure that is rigidly mounted to the building floor. Larger systems may require dual vibratory drives mounted on the sides or frame of the trough. These must be synchronized at all times to avoid unnecessary vibration and destructive interference. The drives when rigidly mounted, have at least one critical speed of mechanical resonance that must be avoided.

Henceforth, a vibrational conveyor drive system that could be retrofit onto an existing vibratory conveyor system to provide an increased vibratory drive longevity, as well as minimizing unwanted vibration, would fulfill a long felt need in the materials movement industry. This new invention utilizes and combines known and new technologies in a unique and novel configuration to overcome the aforementioned problems and accomplish this.

BRIEF SUMMARY

In accordance with various embodiments, a vibratory conveyor drive system that can be strategically incorporated into an existing vibratory conveyor for a minimal cost retrofit, that utilizes common, off the shelf components in a novel arrangement, that has an oscillatory stroke and lift that is easily tunable, that minimizes the vibrational forces transmitted to other than to the trough and its linked components, and lastly has a longevity heretofor unseen in the industry, is herein provided.

Various modifications and additions can be made to the embodiment discussed without departing from the scope of the invention. For example, while the embodiment described above refers to particular features, the scope of this invention also includes embodiments having a different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

DETAILED DESCRIPTION

Figure 1:
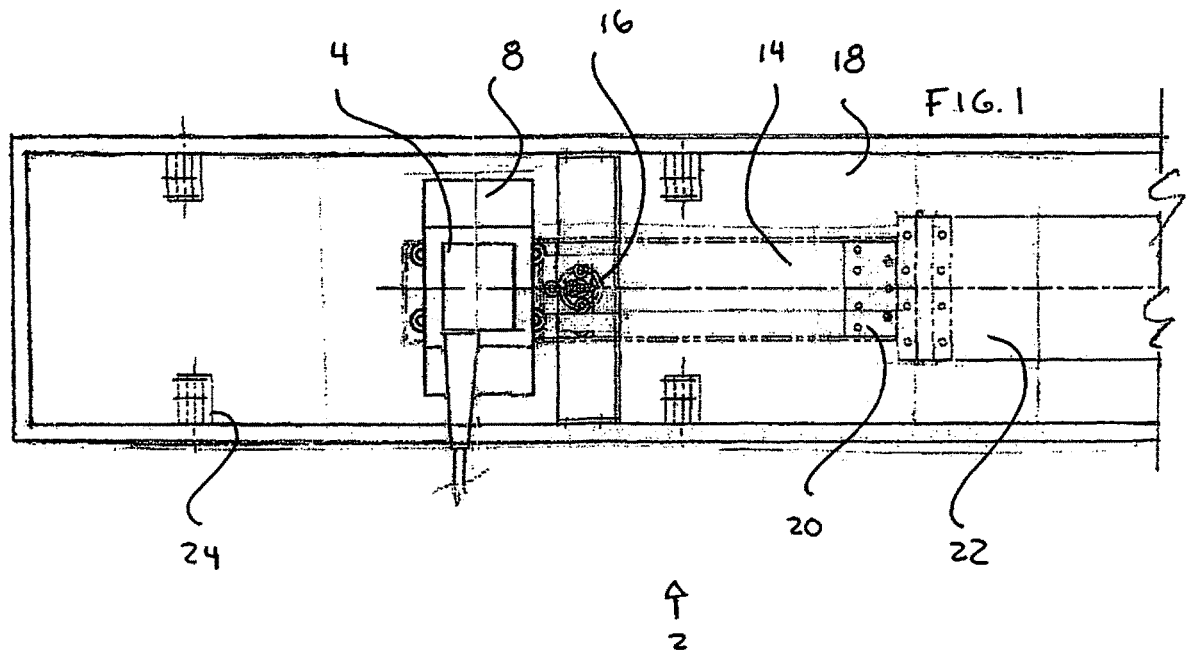
FIG. 1 is a bottom view of a vibratory conveyor with the vibratory conveyor drive system.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details.

It will be understood that when an element or layer is referred to as being "on," "coupled to," or "connected to" another element or layer, it can be directly on, directly coupled to or directly connected to the other element or layer, or intervening elements or layers may be present. Such is the case with the drive arm. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present invention relates to a novel design for a vibrational conveyor drive system that can be fitted onto a plethora of different style of vibrational conveyors. It is an inexpensive, simple retrofit that utilizes common, off the shelf components in a novel arrangement that is easily tunable, and long lasting.

Vibrational conveyors are a method of transporting materials in a linear trough or pan for conveying, sorting, inspection or packaging. The operational principles are simple. The material, such as grass seed, are fed onto one end of a linear trough. The trough is urged into a oscillating, translational motion by a vibrational drive (a rotational motor and unbalanced rotor combination). This oscillatory motion is imparted at an angle to the trough through a drive arm (which is a generally planar, linear plate or member) so as to have both a horizontal component (stroke) and a vertical component (lift). The material by virtue of its friction with the trough, is tossed vertically and horizontally (up and forward along the trough) when the drive arm motor is on its forward, slightly upwardly angled stroke. While the material is briefly in the air, the drive arm undergoes its rear, downwardly angled stroke. This pulls the trough vertically down and horizontally back. Coincident with the end of this motion, the tossed material lands back in the trough (the end of its lift), at a position further forward in the trough than it initiated from, and the trough again starts its horizontal component (stroke) and vertical component (lift) of motion again. This imparts a "hopping" motion of the material in one direction along the trough. The speed of the material movement along the trough, is determined by many factors such as the angle of the trough, the surface roughness of the trough, the amplitude of the vibratory drive motor's stroke and lift motions, the oscillating frequency of the vibratory drive motor, as well as some of the dampening factors accomplished with the other mechanically linked equipment.

In the prior art there are two methods of driving a vibrational conveyor. In the first method there is a fixed rotational motor (generally double shafted) securely attached to the base of the vibratory conveyor. This base is a stout, large mass that is affixed rigidly to the ground. It generally utilizes an isolated trough with a base to trough mass ratio of 1:1 to 5:1, and the base is set on isolation mounts.

The motor indirectly rotates a mass (a vibratory means) that is not balanced about its center of rotation causing it to vibrate, increasingly with speed. The vibrating rotational mass is connected by a drive arm to the trough. The heavy mass and isolation mounting minimize the transmission of unwanted vibration to nearby structures and equipment.

The second method of driving a vibrational conveyor uses a pair of vibrational motors (like concrete/cement vibrators) that are rigidly mounted on opposing sides of the trough. These directly oscillate the trough without additional linkage therebetween. The problem is that these motors have to be run in synchronization to balance (cancel) their vertical vibrations. It is not always easy to get these motors to run in synch. If they run with constructive interference they will minimize the stroke and lift and if they run with destructive interference they will quickly destroy the vibratory conveyor system and/or themselves.

Figure 2:
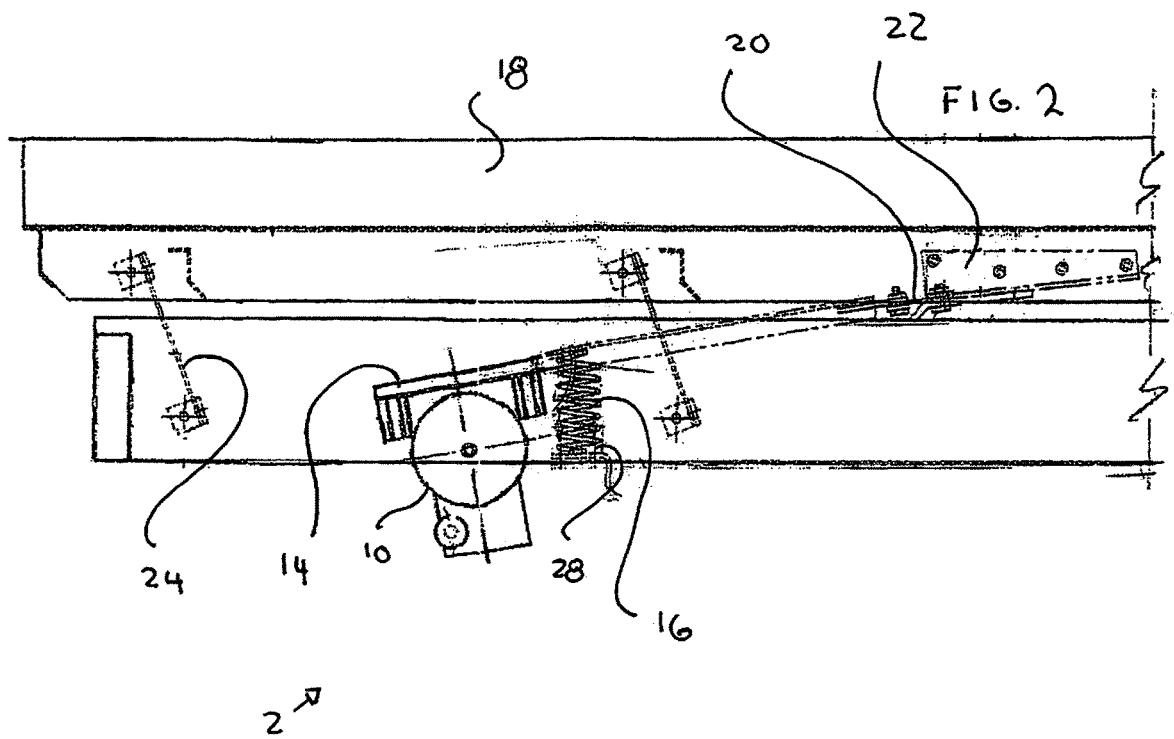
FIG. 2 is a is a side view of a vibratory conveyor with the vibratory conveyor drive system.
Figure 3:
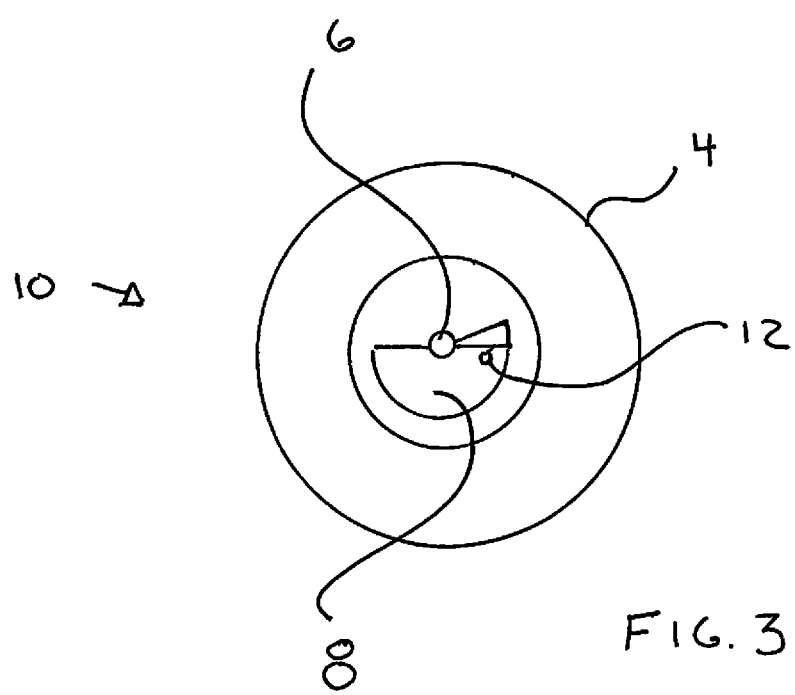
FIG. 3 is an end view of a double shaft vibratory drive motor assembly with an end cap removed.

Looking at FIGS. 1-3 it can be seen that this vibratory conveyor drive system 2 combines a rotational motor 4 with a double shaft 6 that has an adjustable vibratory means 8 (a stack of unbalanced semi-circular steel plates) at either end. This vibratory means 8 is incorporated on the two shaft ends 6 extending from the motor housing and is thus these parts make a direct drive, vibratory drive motor 10. The number of degrees these plates 8 are spread about determines the amplitude of the vibration established. The various plates 8 are adjusted in relation to each other with a mechanical fastener 12 passing therethrough the front plate that frictionally engages the angular position of the various plates with respect to each other. (It eliminates the indirect drive between the rotational motor 4 and the vibratory means 8, and is easily tunable without the need for additional weights 8.) It vibrates in 360 degrees. The vibratory drive motor 10 is directly mounted onto a drive arm 14, and is free to move in a vertical direction as tempered by a compression spring means 16 (generally a wound coil or rubber mass) beneath it. The drive arm 14 is connected to the vibratory trough 18 at one end through at least one flexible connector 20 and a drive plate 22 attached to the trough or the trough frame members. With the vibrational motor vibrating unconstrained vertically, and with the dampening vertical movement of the drive arm 14 on the spring means 16, this vertical motion component is removed from the motion the drive arm 14 passes on to the connected trough 18. This arrangement imparts only translational motion to the drive plate 22 and trough 18. Since the drive arm 14 is set at 20 to 25 degrees (plus or minus 15 degrees) with respect to the plane of the trough, the only motion transmitted or imparted to the trough 18, is the horizontal vector motion (vertical lift and horizontal stroke) transmitted to the trough. (The motor sees less vibration and lasts longer.)

There are a series of flexible supports 24 that are rigidly mounted at one of their ends to the base 26, and rigidly mounted at their other ends to the vibratory trough 18. These flexible supports 24 are mounted with a slight vertical inclination in the direction of travel of the material in the trough 18. (Somewhere between 75 and 89 degrees with respect to the plane of the trough 18.) These flexible supports 24 allow the trough 18 to move fore and aft in its oscillatory path. These are common to all vibratory conveyor systems.

Rigidly affixed along the linear axis of the trough 18 is a drive plate 22. This is a stiff metal or polymer plate. It is affixed to the opposing sides of the trough 18 and resides under the trough 18. In the configuration of the drive plate, there is the mechanical connection to the proximal end of the drive flexure 20. The drive flexure 20 is a flexible polymer plate connected at its distal end to the front end of the drive arm 14. It allows limited flexion in the system for compensation of misalignments and unequal oscillatory vibration. (It is to be noted that the planes of the drive flexure 20 and drive arm 14 are colinear and coincident. They are not parallel to the plane of the trough 18 but rather, there is an included, acute angle (approximately 20 degrees plus or minus 15 degrees), between the plane of the trough 18 and the planes of the drive arm 14 and the drive flexure. This angle allows oscillating vertical component of the vibratory drive motor 10 to impart both a stroke and a lift to the trough movement through the drive arm 14.)

Onto the back end of the drive arm 14 a rotary vibratory drive motor 10 is affixed. The axis of rotation and of its double ended shaft resides perpendicular to the linear axis of the trough 18, and the linear axis of the drive arm 14. It resides centered side to side under the trough 18. It vibrates in 360 degrees. The vibratory drive motor 10 is suspended from the drive arm and is not affixed to the base 26 or the floor, rather it just hangs off of the drive arm 14.

Between the vibratory drive motor 10 and the drive flexure 20, mounted along the length of the drive arm 14, adjacent the vibratory drive motor 10, is a spring means 16. In the preferred embodiment this spring means is a coil compression spring although there are numerous other vertical dampening means that could be employed including elastic polymer masses or hydraulic shock absorbers. The spring means 16 is rigidly mounted at its bottom into a spring support 28 affixed to the system base 26 and at its top to the drive arm 14. In alternate embodiments the spring support 28 may be resting on or attached to the floor, however, this will impart vibration to the surrounding area and affect the freedom of vertical oscillation the vibrational drive motor undergoes. This spring 16 compensates for the vertical component of vibration emanating from the vibratory drive motor 10, as the vibratory drive motor 10 is free to move vertically up and down with the sprung drive arm 14. This leaves just the oscillating horizontal vibration transmitted at an angle to the trough 18 so as to impart a stroke and a lift component. By adjusting the relative positions of the unbalanced weights 8 the stroke and lift can be modified to suit the material transported.

The retrofitting of existing vibratory conveyors systems must include the incorporation of an adjustable vibratory drive motor 10, affixed to a drive arm 14 that is angularly connected to the vibrating trough 18 with a drive flexure 20, having its vertical vibrations eliminated via a vertically oriented compression spring 16 affixed between the system frame and the drive arm 14, adjacent the vibratory drive motor 10. The elimination of other system components such as rotational drive/s, vibratory means (unbalanced/eccentric weights) rigid motor mounting will be as necessary depending on the existing design The concept of the retrofit is to get an off the shelf adjustable, vibrational motor coupled at a horizontal angle of approximately 20 degrees (plus or minus 15 degrees) to the trough in a manner that allows the vibrational drive motor to have unconstrained movement in the vertical direction.

With the modified vibrating conveyor system, the vibrating motion is substantially confined to the trough and the vibratory drive with minimal vibratory forces reaching the system's supporting structure. With the vibratory drive not constrained in the vertical direction, but free to move on its spring mount, it experiences much less internal friction of its parts and its longevity is dramatically enhanced.

The steps to fit a vibrational conveyor drive system to an existing vibrational conveyor comprises:
  removing an existing vibratory drive motor assembly and all of its connections to the vibratory conveyor including connections to the trough, the trough frame, the base and the floor;
  rigidly affixing a drive plate to opposing sides of the trough or trough frame, residing along the linear axis of the trough and from beneath the trough;
  flexibly connecting a drive flexure between the drive plate and one end of a drive arm such that the plane of the drive flexure and drive arm are at an acute angle of 20 degrees (plus or minus 15 degrees) relative to the plane of the trough;
  mounting a rotary vibratory drive motor onto the back end of the drive plate;
  installing a spring means between the underside of the drive plate and the base, residing between the vibratory drive motor and the drive flexure;
  rigidly mounting at least one flexible support at one of its ends to the base and at its other end to the vibratory trough such that it is mounted with a slight vertical inclination between 75 and 89 degrees with respect to the plane of the trough and towards the direction of travel of the material in the trough.

Although the preferred embodiment has a drive arm coupled to a drive flexure coupled to a drive plate which is coupled to the trough, it is known that these elements can all be integrated into the drive arm. Possibly, with the advances in materials, the drive arm may be fabricated from a material that eliminates the need for a separate drive plate and drive flexure.

Having described and illustrated the principles of the inventive concept with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated.

Consequently, in view of the wide variety of permutations to the embodiments described herein, this detailed description and accompanying material is intended to be illustrative only, and should not be taken as limiting the scope of the inventive concept. What is claimed as the invention, therefore, is all such modifications as may come within the scope and spirit of the following claims and equivalents thereto.

Having thus described the invention, what is claimed as new and desired to be secured by Letters Patent is as follows:

1. A vibratory conveyor drive system for oscillating a vibratory trough of a vibratory conveyor, comprising:
  a drive arm having a first end and a second end, and residing below a vibratory trough;
  a vibratory drive motor;
  wherein a first end of said drive arm is connected to said vibratory trough, and said vibratory motor is suspended at said second end of said drive arm; and
  wherein said drive arm has a plane that resides at an included, acute angle with respect to a longitudinal plane of said vibratory trough; and
  a spring means in contact with and residing between said drive arm and a base of said vibratory conveyor, and located on said drive arm between said vibratory drive motor and a drive flexure.

2. The vibratory conveyor drive system for oscillating a vibratory trough of a vibratory conveyor, of claim 1, wherein said included acute angle between said plane of said drive arm and said plane of said vibratory trough, is 20 degrees plus or minus 15 degrees.

3. The vibratory conveyor drive system for oscillating a vibratory trough of a vibratory conveyor of claim 1, further comprising:
  a rigid drive plate having a first end and a second end;
  a drive flexure having a front end and a rear end; and
  wherein said first end of said rigid drive plate is affixed to said vibratory trough, and said second end of said rigid drive plate is connected to said front end of said drive flexure; and
  wherein said rear end of said drive flexure is connected to said first arm of said drive arm.

4. The vibratory conveyor drive system for oscillating a vibratory trough of a vibratory conveyor of claim 1, further comprising a spring support mounted between said spring means and said base.

5. The vibratory conveyor drive system for oscillating a vibratory trough of a vibratory conveyor of claim 1, wherein said spring means is a wound coil compression spring.

6. The vibratory conveyor drive system of claim 1 wherein said vibratory motor is a rotational motor with a shaft extending from each end of said rotational motor, said shaft having at least one of an adjustable vibratory means mounted thereon.

7. The vibratory conveyor drive system of claim 6 wherein said adjustable vibratory means is a stack of semi-circular steel plates mounted on each end of said shaft and said steel plates fixedly adjustable in relation to one another.

8. The vibratory conveyor drive system of claim 1, further comprising:
   at least one flexible support having a first end and a second end, said flexible support rigidly mounted at said first end to said base, and rigidly mounted at said second end to said vibratory trough.

9. The vibratory conveyor drive system of claim 8 wherein said flexible support is mounted with a vertical inclination in a direction of travel of material in said trough between 75 and 89 degrees with respect to said longitudinal plane of said trough.

10. A vibratory conveyor drive system for oscillating a vibratory trough of a vibratory conveyor, comprising:
   a drive arm having a first end and a second end, and residing below a vibratory trough;
   a vibratory drive motor consisting of a rotational motor with a shaft extending from each end of said rotational motor, said shaft having at least one of an adjustable vibratory means mounted thereon;
   wherein said adjustable vibratory means is a stack of semi-circular steel plates mounted on each end of said shaft and said steel plates fixedly adjustable in relation to one another; and
   wherein a first end of said drive arm is connected to said vibratory trough, and said vibratory motor is suspended at said second end of said drive arm; and
   wherein said drive arm has a plane that resides at an included, acute angle with respect to a longitudinal plane of said vibratory trough; and
   a spring means in contact with and residing between said drive arm and a base of said vibratory conveyor.

\* \* \* \* \*